United States Patent
Duan et al.

(10) Patent No.: US 10,661,351 B2
(45) Date of Patent: May 26, 2020

(54) QUICK-STOP CUTTING DEVICE FOR A LATHE

(71) Applicant: DALIAN UNIVERSITY OF TECHNOLOGY, Dalian, Liaoning (CN)

(72) Inventors: Chunzheng Duan, Liaoning (CN); Yumin Liu, Liaoning (CN); Wei Sun, Liaoning (CN); Yuwen Sun, Liaoning (CN); Fangyuan Zhang, Liaoning (CN); Kang Ju, Liaoning (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/341,398

(22) PCT Filed: Oct. 11, 2017

(86) PCT No.: PCT/CN2017/105636
§ 371 (c)(1),
(2) Date: Apr. 11, 2019

(87) PCT Pub. No.: WO2019/051912
PCT Pub. Date: Mar. 21, 2019

(65) Prior Publication Data
US 2020/0038961 A1 Feb. 6, 2020

(30) Foreign Application Priority Data

Sep. 12, 2017 (CN) .......................... 2017 1 0812023

(51) Int. Cl.
*B32B 25/06* (2006.01)
*B23B 27/08* (2006.01)
(Continued)

(52) U.S. Cl.
CPC .............. *B23B 27/08* (2013.01); *B23B 25/06* (2013.01); *B23B 29/18* (2013.01); *B23Q 17/2233* (2013.01)

(58) Field of Classification Search
CPC ......... B23B 27/08; B23B 25/06; B23B 25/00; B23B 29/18; B23B 29/244;
(Continued)

(56) References Cited

U.S. PATENT DOCUMENTS 3,753,384 A * 8/1973 Anfindsen ............... B23B 29/12
                                                                409/293
5,214,989 A * 6/1993 Giannetti .............. B23B 29/244
                                                                82/159

(Continued)

FOREIGN PATENT DOCUMENTS

CN       1743106 A     3/2006
CN     201862790 U     6/2011
(Continued)

*Primary Examiner* — Sara Addisu
(74) *Attorney, Agent, or Firm* — Muncy, Geissler, Olds & Lowe, P.C.

(57) ABSTRACT

A tool quick-stop device for a lathe has a base, bottom plate, front side plate, rear side plate, right side plate, left side plate, top fixed plate, tool bar, cam lever, buffer spring, cylindrical guide rail, adjusting nut, first locking nut, double end stud, second locking nut, pressure spring, pressing plate, hold-down bolt and pin shaft. The cam lever supports the tool bar before tool falling. When tool falling is required, the cam lever is rotated through external force. When the cam lever rotates over a certain position, the tool bar instantaneously loses supporting force. Under strong pressure of the pressure spring, the tool bar falls the tool with great acceleration and is separated from the cutting region in a short period of time and the cutting root is frozen.

1 Claim, 6 Drawing Sheets

(51) Int. Cl.
 *B23B 29/18* (2006.01)
 *B23Q 17/22* (2006.01)
 *B23B 25/06* (2006.01)

(58) Field of Classification Search
 CPC ... B23Q 17/2233; B23Q 5/58; Y10T 82/2589; Y10T 82/2591; Y10T 408/95; Y10T 409/30952
 See application file for complete search history.

(56) References Cited

U.S. PATENT DOCUMENTS 5,556,241 A * 9/1996 Hipwell ................ B23Q 11/04
 29/DIG. 51
2016/0114404 A1* 4/2016 Yang ..................... B23Q 5/22
 407/9

FOREIGN PATENT DOCUMENTS

| CN | 203109255 U | | 8/2013 |
|----|-------------|---|--------|
| CN | 107116238 A | | 9/2017 |
| CN | 108436116 A | * | 8/2018 |
| DE | 202015004771 U1 | | 8/2015 |
| JP | 2004314274 A | * | 11/2004 |

* cited by examiner

QUICK-STOP CUTTING DEVICE FOR A LATHE

TECHNICAL FIELD

The present invention belongs to the technical field of cutting, and relates to a tool quick-stop device for a lathe.

BACKGROUND

To research the cutting mechanism of a metal cutting process, various tool quick-stop devices are widely used at present. Through tool quick-stopping in the cutting process, the samples of deformation region and chip root under the cutting conditions are obtained. Then, the samples are observed through different methods. Physical models formed by all kinds of cutting are established to reveal the metal cutting mechanism to achieve the purpose of describing or predicting the cutting process. To enable the cutting root sample to be closer to a state during cutting, the quick-stop device must be designed in such a manner that the falling acceleration of the tool is large enough, the separation time of the tool and the workpiece is short as much as possible, the motion track of the tool tip is reasonable during tool falling and the cutting root should be influenced to the minimum degree in the separation process of the tool and the workpiece.

At present, common tool quick-stop devices for a lathe include a hand hammer type, a shooting type, an explosion type, etc. The hand hammer device has large vibration during beating of a hand hammer, which influences tool cutting and the precision of the machine tool. The shooting device has high operation danger coefficient. The explosion device is uneven in acceleration, the initial acceleration value is less than a later obtainable value; and the operation is complicated; the drug consumption for explosion and shear force required for pin shearing are difficult to be accurately calculated; and the operation is unsafe and noise is large. The above tool quick-stop devices need to cut off shear pins. At present, some patents avoid the damage to the shear pins through structural design, the tool falling is in such a manner that the tool rotates, but the rotating axis of the tool is lower than a horizontal plane of the turning center, so that the falling motion track (arc) of the tool tip is intersected with the excircle of the workpiece, causing that the tool tip extrudes the workpiece and the chip root and the tool tip are adversely affected. If compression of the spring is used as the power, the end surface of the spring is not close to the tool surface in the rotation of the tool and the spring cannot always keep good contact with the tool bar, causing a tool falling acceleration error.

SUMMARY

To solve the above problems, the present invention provides a tool quick-stop device for a lathe.

The technical solution of the present invention is as follows:

A quick-stop cutting device for a lathe comprises a base 1, a bottom plate 2, a front side plate 3, a rear side plate 4, a right side plate 5, a left side plate 6, a top fixed plate 7, a tool bar 8, a cam lever 9, a buffer spring 10, a cylindrical guide rail 11, an adjusting nut 12, a first locking nut 13, a double end stud 14, a second locking nut 15, a pressure spring 16, a pressing plate 17, a hold-down bolt 18, a guide rail fastening screw 19, a height adjusting screw 20, a fastening screw 21 and a pin shaft 22;

The base 1 is fixed to the lathe; the lower ends of the front side plate 3, the rear side plate 4, the right side plate 5 and the left side plate 6 are fixedly connected with the base 1, and the upper ends are connected with the top fixed plate 7 to form a frame structure; a square hole is formed in the front side plate 3 so that the head of the tool bar 8 extends from the square hole;

A pin shaft seat, cylindrical holes, a threaded hole and a screw through hole are formed in the bottom plate 2; the cam lever 9 is fixed to the pin shaft seat through the pin shaft 22; the cam lever 9 rotates around the pin shaft 22; the cylindrical holes are symmetrically located on both ends of the bottom plate 2; the lower end of the cylindrical guide rail 11 is fixed to the cylindrical holes; the upper end of the cylindrical guide rail 11 is fixed to the top fixed plate 7 through the guide rail fastening screw 19; the height adjusting screw 20 is matched with the threaded hole in the bottom plate; when the height adjusting screw 20 rotates, because the bottom of the height adjusting screw 20 is blocked by the base 1 and only the bottom plate 2 is lifted or declined, the height position of the cam lever 9 is also correspondingly lifted or declined and then the adjustment of the height position of the tool bar 8 supported by the cam lever 9 is realized; after the height position is adjusted, the fastening screw 21 is matched with the threaded through hole to fix the bottom plate 2 to the base 1;

The cylindrical hole is formed in the middle and upper position of the cam lever 9 for a flexible rope to pass and tie; when the flexible rope is pulled through external force, the cam lever 9 is forced to rotate; there is a cylindrical through hole in the tool bar 8; the cylindrical through hole is matched with the cylindrical guide rail 11 to make the tool bar 8 slide along the cylindrical guide rail 11; a wedge-shaped tool bar groove is formed at one side of the middle of the tool bar 8; the width of the wedge-shaped tool bar groove is greater than the thickness of the cam lever 9; when the cam lever 9 supports the tool bar 8, a contact line between the cam lever 9 and the tool bar 8 is an intersecting line between a bevel of the tool bar groove and the bottom surface of the tool bar 8;

The buffer spring 10 and the pressure spring 16 penetrate through the cylindrical guide rail 11; the buffer spring 10 is limited between the tool bar 8 and the bottom plate 2 to buffer the impact of the tool bar 8 after tool lowering; the pressure spring 16 is arranged between the tool bar 8 and the pressing plate 17 to provide quick-stopping power for the tool bar 8;

One end of the double end stud 14 is matched with the threaded hole in the pressing plate 17, and is locked by the second locking nut 15; the other end is matched with the adjusting nut 12; the adjusting nut 12 is rotated so that the distance from the lower end surface of the pressing plate 17 to the lower end surface of the adjusting nut 12 is changed; this distance is the length of the compressed pressure spring 16; during compression, when the lower surface of the adjusting nut 12 contacts the upper surface of the tool bar 8, the pressure spring 16 cannot be compressed; after a required compression length is adjusted, the adjusting nut 12 is locked by the first locking nut 13; the hold-down bolt 18 penetrates through the top fixed plate 7, realizes adjustment of the pressing plate 17 together with the adjusting nut 12, the first locking nut 13, the double end stud 14 and the second locking nut 15, and then adjusts the amount of compression of the pressure spring 16.

The present invention has the following beneficial effects:

1. Because the tool falling manner is that the tool bar falls in a straight line instead of rotating the tool, the spring can always keep good contact with the tool bar, thereby reducing the error of tool falling acceleration; meanwhile, the track of the tool tip is not intersected with the machined surface of the workpiece during tool lowering, so that the tool tip may not extrude the workpiece and thus may not destroy the cutting root and the tool tip;

2. The cam lever is used to support the tool bar; during tool falling, only the cam lever is rotated with external force by an angle without breaking the pin, thereby avoiding the waste of the material and saving experiment cost; because the top profile of the cam lever is a cylindrical surface, the tool keeps static in the rotation process of the cam lever prior to tool falling and established cutting parameter conditions are kept;

3. The height of the tool tip can be adjusted through the height adjusting screw of the bottom plate, thereby realizing stepless regulation and avoiding stepped regulation due to the use of gaskets with different thicknesses;

4. The length of the compressed spring can be adjusted in advance; when the spring is compressed to the adjusted position, compression may be stopped, thereby ensuring consistent pressure of the spring prior to each tool falling so that the accelerations are consistent and the difference of chip root samples due to inconsistent tool falling acceleration is avoided; and the buffer spring is used, so tool falling impact is small.

In the figures: 1 base; 2 bottom plate; 3 front side plate; 4 rear side plate; 5 right side plate; 6 left side plate; 7 top fixed plate; 8 tool bar; 9 cam lever; 10 buffer spring; 11 cylindrical guide rail;

12 adjusting nut; 13 first locking nut; 14 double end stud; 15 second locking nut; 16 pressure spring; 17 pressing plate; 18 hold-down bolt; 19 guide rail fixing screw; 20 height adjusting screw;

21 fastening screw; and 22 pin shaft.

DETAILED DESCRIPTION

The following describes in detail the technique project of the present invention with the attached figures.

Figure 1:
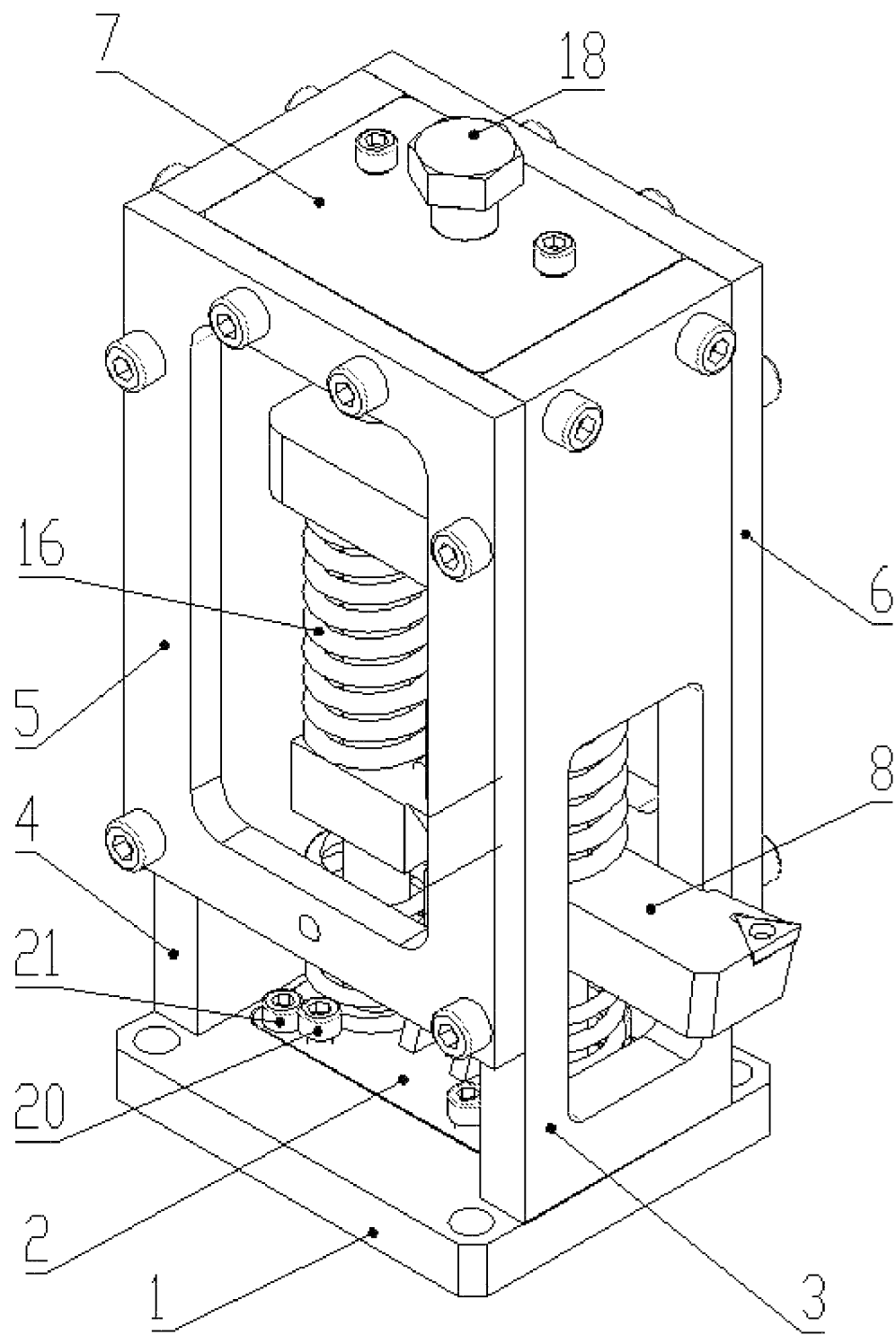
FIG. 1 is an outside view of a device in the present invention.
Figure 2:
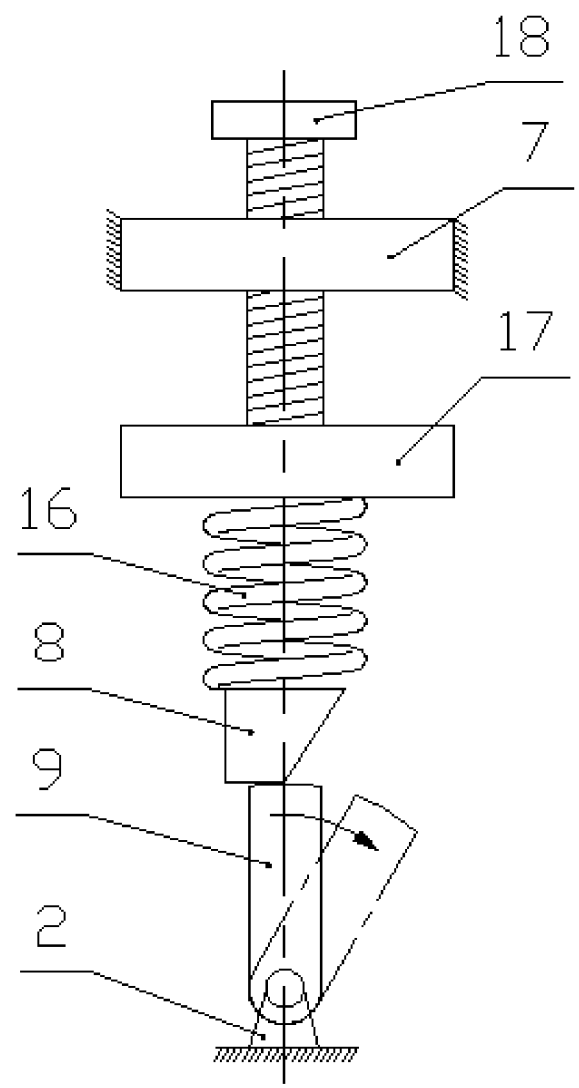
FIG. 2 is a schematic diagram of a device in the present invention.
Figure 3:
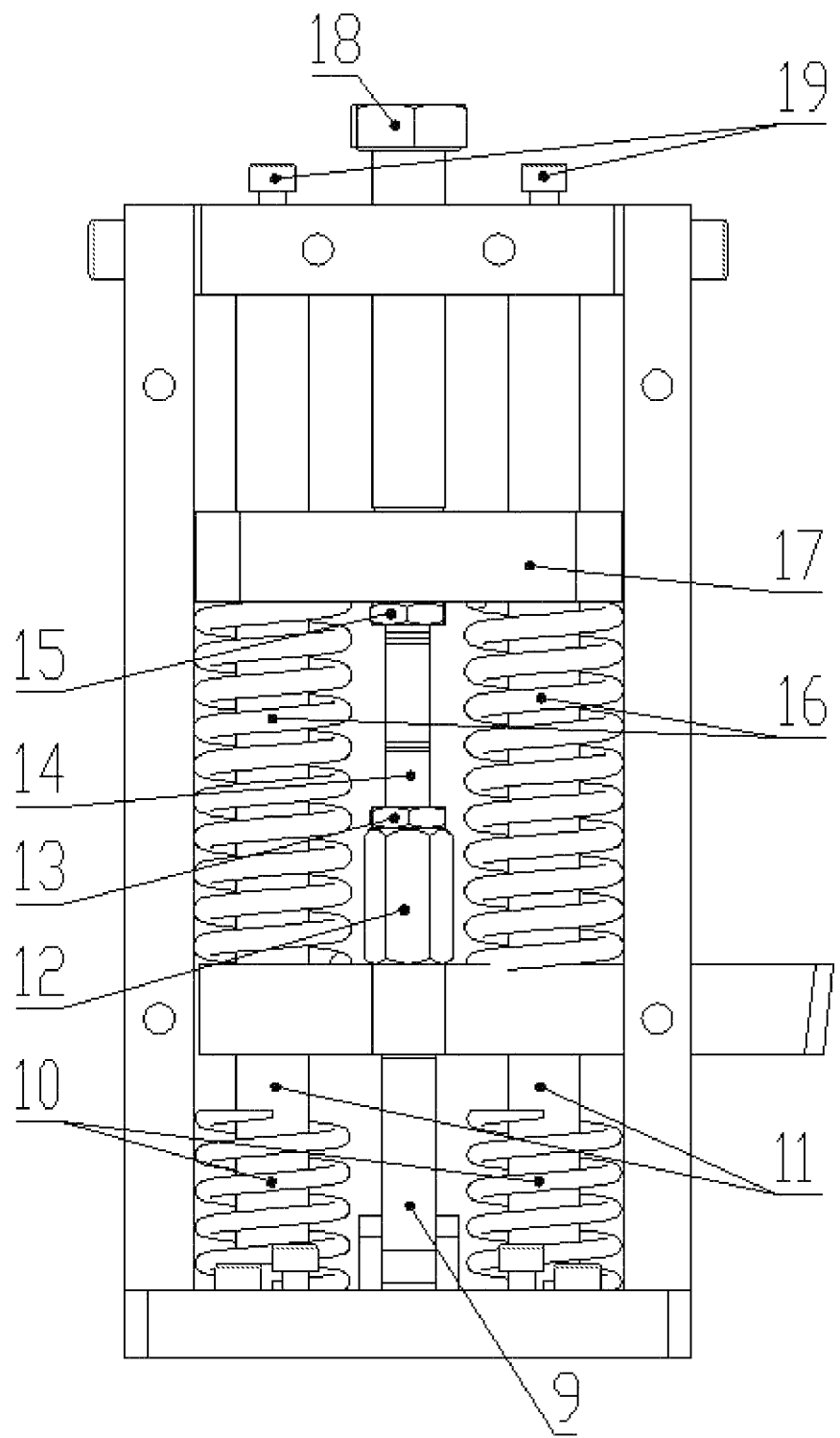
FIG. 3 is a schematic diagram of an internal structure of a device in the present invention.
Figure 5:
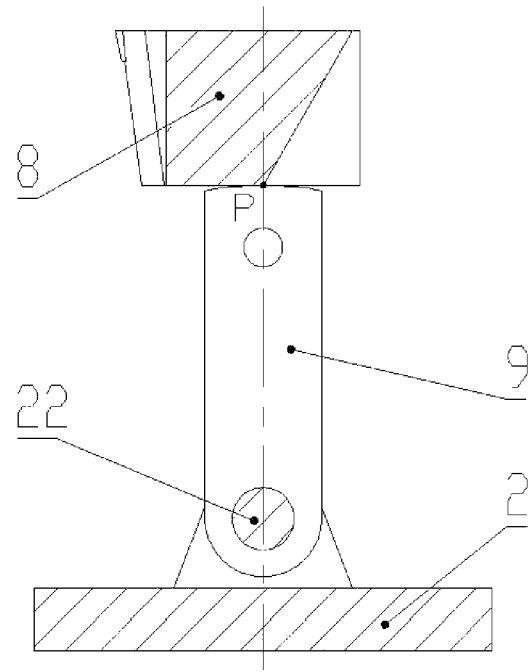
FIG. 5 is a schematic diagram of a supporting position of a cam lever when a device in the present invention performs cutting operation.
Figure 6:
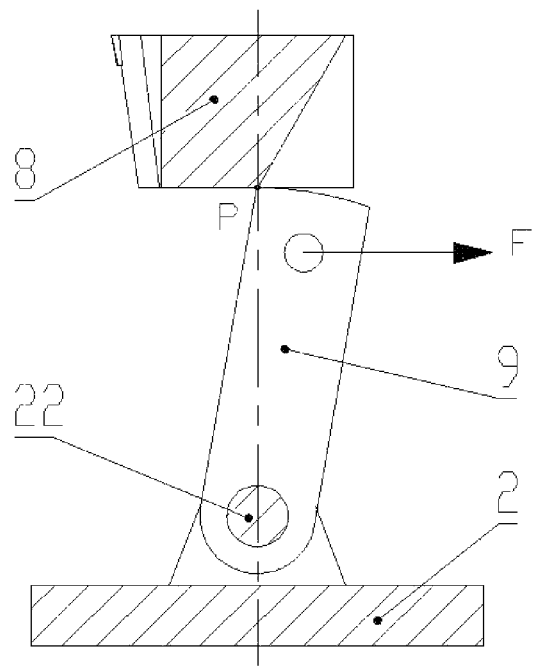
FIG. 6 is a schematic diagram of a position of a cam lever at the beginning of tool falling of a device in the present invention.
Figure 7:
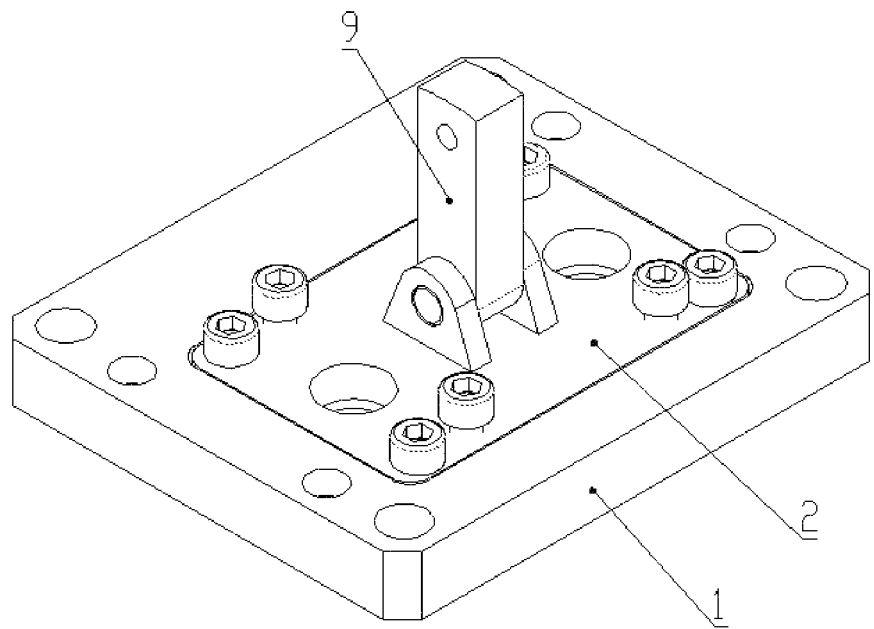
FIG. 7 is an appearance schematic diagram of a height fine-adjusting mechanism of a tool of a device in the present invention.
Figure 8:
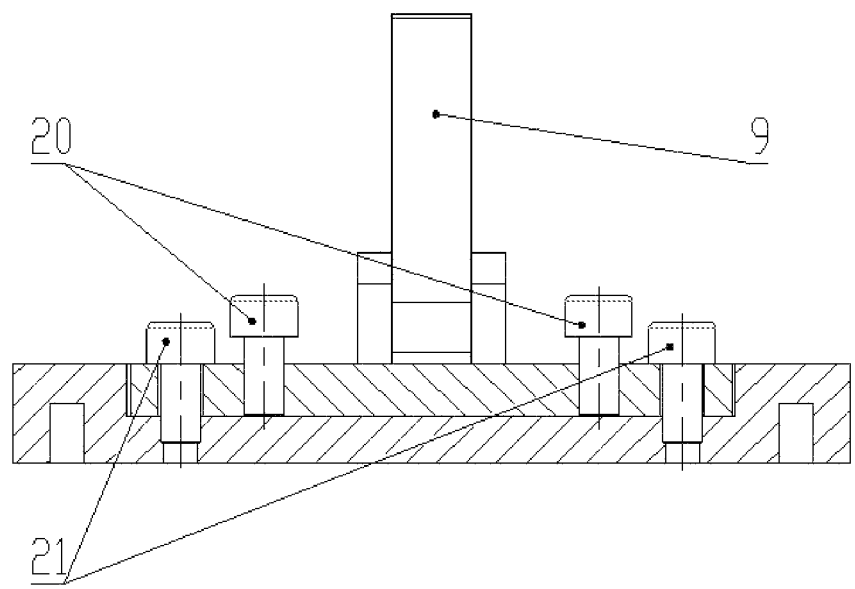
FIG. 8 is a schematic diagram of a height fine-adjusting mechanism of a tool of a device in the present invention.

As shown in FIG. 1 to FIG. 9, the present invention provides a tool quick-stop device for a lathe, comprising a base 1, a bottom plate 2, a front side plate 3, a rear side plate 4, a right side plate 5, a left side plate 6, a top fixed plate 7, a tool bar 8, a cam lever 9, a buffer spring 10, a cylindrical guide rail 11, an adjusting nut 12, a first locking nut 13, a double end stud 14, a second locking nut 15, a pressure spring 16, a pressing plate 17, a hold-down bolt 18, a guide rail fastening screw 19, a height adjusting screw 20, a fastening screw 21 and a pin shaft 22. The device of the present invention is fixed to the lathe through the base 1. The present invention does not limit the fixing manner and the fixing position. Those skilled in the art can make selection according to actual conditions. For example, the device can be installed on a carriage in a sliding box of the lathe through a transition plate. A threaded hole is formed in the base 1. The bottom plate 2 can be fixed through the fastening screw 21, as shown in FIG. 7 and FIG. 8. The tool falling track of the device of the present invention is a straight line. A linear guide rail is adopted. The device of the present invention does not limit the shape and the length of the section of the linear guide rail, but preferably, a cylindrical guide rail as shown in FIG. 3 is adopted.

The principle of the device of the present invention is: when the tool bar 8 loses the supporting of the cam lever 9, under strong pressure of the pressure spring 16, the tool bar 8 moves with great acceleration along the direction of the cutting speed so that the tool is rapidly separated from the cutting region and the cutting state is frozen, as shown in FIG. 2.

A pin shaft seat is arranged on the bottom plate 2 of the device of the present invention and is connected with the cam lever 9 through the pin shaft 22. The cam lever 9 rotates around the pin shaft. A cylindrical hole, threaded holes and threaded through holes are also formed in the bottom plate 2. The cylindrical hole can pass through the cylindrical guide rail 11. The threaded holes are matched with the adjusting screw 20 to adjust the height of the tool tip. The threaded through holes can pass through the fastening screw 21 to fasten the bottom plate 2, as shown in FIG. 7 and FIG. 8. The sizes and the quantities of the threaded through holes and the threaded holes are not limited. In the device of the present invention, one threaded hole and one threaded through hole are respectively formed near four corners of the bottom plate 2 so that a stress state is good.

Figure 4:
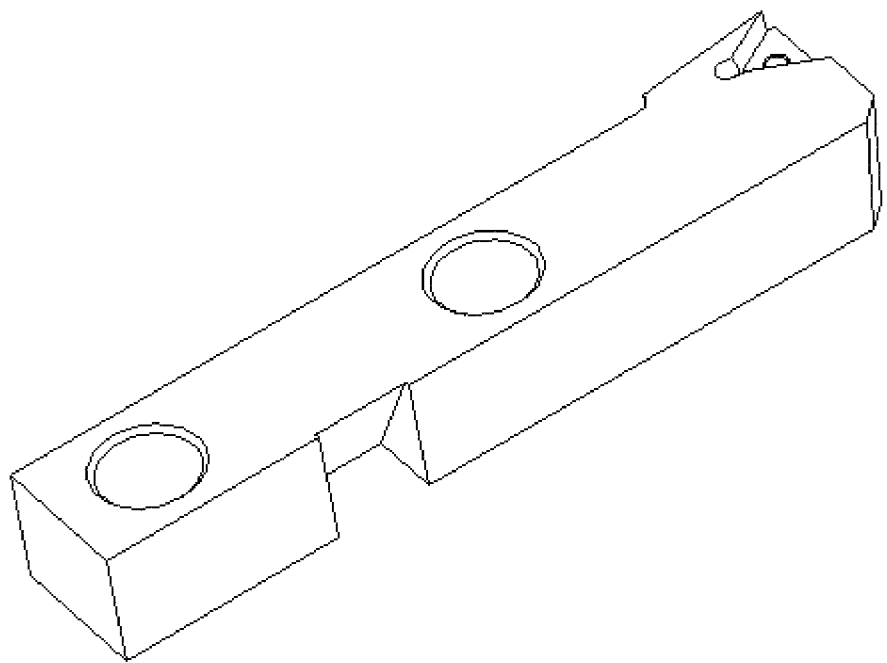
FIG. 4 is a structural schematic diagram of a tool bar of a device in the present invention.

The tool bar 8 of the device of the present invention has the cylindrical hole which is, as shown in FIG. 4, matched with the cylindrical guide rail 11 so that the tool bar can slide linearly along the guide rail. A groove is formed at one side of the middle of the tool bar. As shown in FIG. 5 and FIG. 6, the position of the axis of the pin shaft shall ensure that the contact line between the cam lever and the tool bar is the intersecting line between the bevel of the groove and the bottom surface of the tool bar. Preferably, the intersecting line between the bevel of the groove and the bottom surface of the tool bar 8 in the device of the present invention is located in the middle of the tool bar 8. The axis of the pin shaft 22 is located directly under the intersecting line, as shown in FIG. 5, so that the tool bar 8 is free from the moment of force in the direction perpendicular to the paper under the pressure of the pressure spring 16. The slope angle of the bevel of the groove of the tool bar 8 is unlimited, but shall not enable the cam lever 9 to self-lock.

The cam lever 9 of the device of the present invention has a pin shaft hole which is connected with the bottom plate 2 through the pin shaft 22. The cam lever 9 can rotate around the pin shaft 22. The top of the cam lever 9 is a cylindrical surface, which ensures that the tool bar 8 is immovable when the cam lever 9 rotates around the pin shaft 22 at the time of tool falling for turning. FIG. 5 shows a situation that the tool bar 8 contacts the cam lever 9 during cutting, and the contact is always in the position of P point before tool falling. When tool falling is required, the cam lever 9 is driven by external force until the edge of the cam lever exceeds the position of P point; and the tool bar 8 loses the supporting and realizes tool quick falling under the action of the pressure spring 16. FIG. 6 shows a situation that the tool bar 8 contacts the cam lever 9 at the moment that tool falling is started. The thickness of the cam lever 9 shall be less than the width of the groove of the tool bar 8. The sizes of the length and the width and the rotation manner of the cam lever 9 driven by the external force are unlimited. Preferably, a small hole is formed in the cam lever 9 for the convenience of connecting components that drive the cam lever 9 to rotate when tool falling is required. The cam lever 9 can be pulled using a flexible slender body (such as a rope).

The buffer spring 10 is arranged below the tool bar 8 of the device of the present invention to buffer the impact of the tool bar 8 after tool falling.

Figure 9:
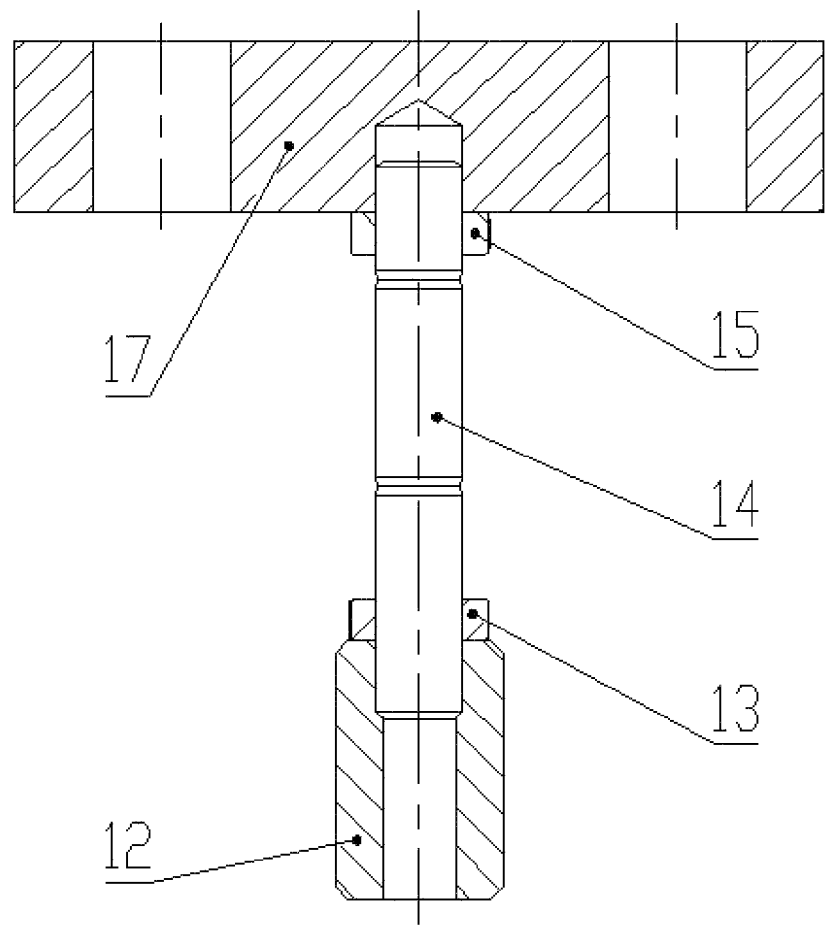
FIG. 9 is a schematic diagram of an adjusting component of amount of compression of a spring of a device in the present invention.

The pressure spring 16 in the device of the present invention pushes a pressing block 17 for compaction through the hold-down bolt 18. As shown in FIG. 9, a threaded blind hole is formed at the lower side of the pressing block 17 and is connected with the double end stud 14; the locking nut 15 is locked. The adjusting nut 12 is arranged on the other end of the double end stud 14. The distance from the lower end surface of the adjusting nut 12 to the lower plane of the pressing block 17 is the length of the compressed pressure spring 16 during cutting. The amount of compression of the pressure spring 16 can be adjusted through the adjusting nut 12, and the locking nut 13 is used for locking.

The device of the present invention is suitable for common lathes, is also suitable for numerical control lathes and does not limit the models of the lathes. The device of the present invention does not limit the specific model of the tool bar 8 which can be modified through a standard turning tool.

In actual operation, see the following steps: the device of the present invention is firstly installed on the lathe; the hold-down bolt 18 is unscrewed until it is easy to erect the cam lever 9 to support the tool bar 8; and a flexible tensile rope is penetrated through the small hole above the cam lever 9 and tied down. By referring to FIG. 7 and FIG. 8, the fastening screw 21 is unscrewed; the height (the height shall ensure that the tool tip of the tool supported is on a horizontal plane in which the center of the main shaft of the lathe is located) of the supporting surface of the cam lever 9 is adjusted; and the fastening screw 21 is tightened after adjusting. By referring to FIG. 3 and FIG. 9, one end of the double end stud is assembled to the pressing block 17, and is locked by the locking nut 15. The adjusting nut 12 is rotated to adjust the length (i.e., adjust the amount of compression of the pressure spring 16) of the compressed pressure spring 16; the cam lever 9 is erected; the hold-down bolt 18 is rotated; the pressure spring 16 is pushed to compress the tool bar 8 until the adjusting nut 12 contacts the tool bar 8 and the hold-down bolt 18 cannot further perform compaction; and then cutting can be performed.

When tool falling is required, the rope tied to the cam lever 9 is pulled with force, as shown in FIG. 6. When the edge of the cam lever 9 exceeds the position of P point, the tool bar 8 instantaneously loses supporting force. Under strong pressure of the pressure spring 16, the tool bar 8 falls the tool with great acceleration and is separated from the cutting region in a short period of time and the chip root is frozen. When the tool bar 8 contacts the buffer spring 10, the tool bar 8 is buffered. At this point, one tool falling test is completed.

The tool bar 8, the pressure spring 16 and the buffer spring 10 of the device of the present invention cannot slide out of the cylindrical guide rail 11, so it is safe and reliable. The device of the present invention is small in impact, and does not damage the machine tool. After first clamping adjustment, resetting time is short. The tool tip does not interfere with the workpiece during tool falling, so tool falling can be rapidly and effectively conducted.

The above introduces the basic principle, main features and advantages of the device of the present invention. The above embodiments do not limit the present invention in any form. Technical solutions obtained by adopting equivalent replacement or equivalent transformation shall be included in the protection scope of the present invention.

We claim:

1. A quick-stop cutting device for a lathe, wherein the quick-stop cutting device for the lathe comprises a base, a bottom plate, a front side plate, a rear side plate, a right side plate, a left side plate, a top fixed plate, a tool bar, a cam lever, a buffer spring, a cylindrical guide rail, an adjusting nut, a first locking nut, a double end stud, a second locking nut, a pressure spring, a pressing plate, a hold-down bolt, a guide rail fastening screw, a height adjusting screw, a fastening screw and a pin shaft;

the base is fixed to the lathe; the lower ends of the front side plate, the rear side plate, the right side plate and the left side plate are fixedly connected with the base, and the upper ends are connected with the top fixed plate to form a frame structure; a square hole is formed in the front side plate so that the head of the tool bar extends from the square hole;

a pin shaft seat, cylindrical holes, a threaded hole and a screw through hole are formed in the bottom plate; the cam lever is fixed to the pin shaft seat through the pin shaft; the cam lever rotates around the pin shaft; the cylindrical holes are symmetrically located on both ends of the bottom plate; the lower end of the cylindrical guide rail is fixed to the cylindrical holes; the upper end of the cylindrical guide rail is fixed to the top fixed plate through the guide rail fastening screw; the height adjusting screw is matched with the threaded hole in the bottom plate; when the height adjusting screw rotates, because the bottom of the height adjusting screw is blocked by the base and only the bottom plate is lifted or declined, the height position of the cam lever is also correspondingly lifted or declined and then the adjustment of the height position of the tool bar supported by the cam lever is realized; after the height position is adjusted, the fastening screw is matched with the threaded through hole to fix the bottom plate to the base;

the cylindrical hole is formed in the middle and upper position of the cam lever for a flexible rope to pass and tie; when the flexible rope is pulled through external force, the cam lever is forced to rotate; there is a cylindrical through hole in the tool bar; the cylindrical through hole is matched with the cylindrical guide rail to make the tool bar slide along the cylindrical guide rail; a wedge-shaped tool bar groove is formed at one side of the middle of the tool bar; the width of the wedge-shaped tool bar groove is greater than the thickness of the cam lever; when the cam lever supports the tool bar, a contact line between the cam lever and the tool bar is an intersecting line between a bevel of the tool bar groove and the bottom surface of the tool bar;

the buffer spring and the pressure spring penetrate through the cylindrical guide rail; the buffer spring is limited between the tool bar and the bottom plate to buffer the impact of the tool bar after tool quick-stopping; the pressure spring is arranged between the tool bar and the pressing plate to provide quick-stopping power for the tool bar;

one end of the double end stud is matched with the threaded hole in the pressing plate, and is locked by the second locking nut; the other end is matched with the adjusting nut; the adjusting nut is rotated so that the distance from the lower end surface of the pressing plate to the lower end surface of the adjusting nut is changed; this distance is the length of the compressed pressure spring; during compression, when the lower surface of the adjusting nut contacts the upper surface of the tool bar, the pressure spring cannot be compressed; after a required compression length is adjusted, the adjusting nut is locked by the first locking nut; the hold-down bolt penetrates through the top fixed plate, realizes adjustment of the pressing plate together with the adjusting nut, the first locking nut, the double end stud and the second locking nut, and then adjusts the amount of compression of the pressure spring.

* * * * *